Oct. 30, 1956 P. J. DONALD 2,769,070
PRESSURE TRANSDUCER APPARATUS
Filed Oct. 16, 1952
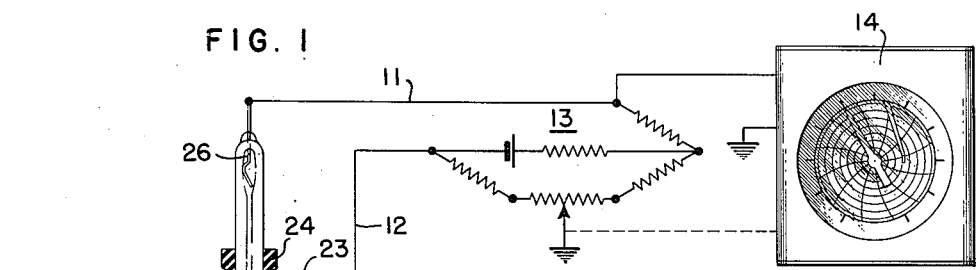
FIG. 1
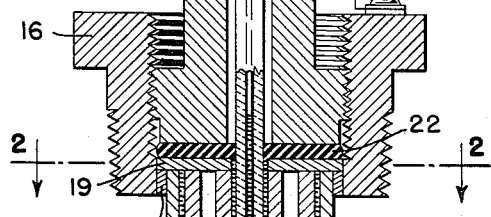
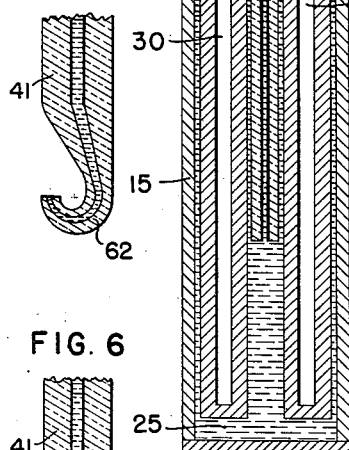
FIG. 5
FIG. 6
FIG. 4
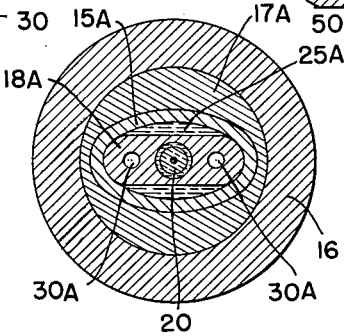
FIG. 2A
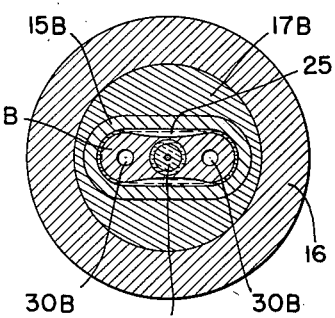
FIG. 2B
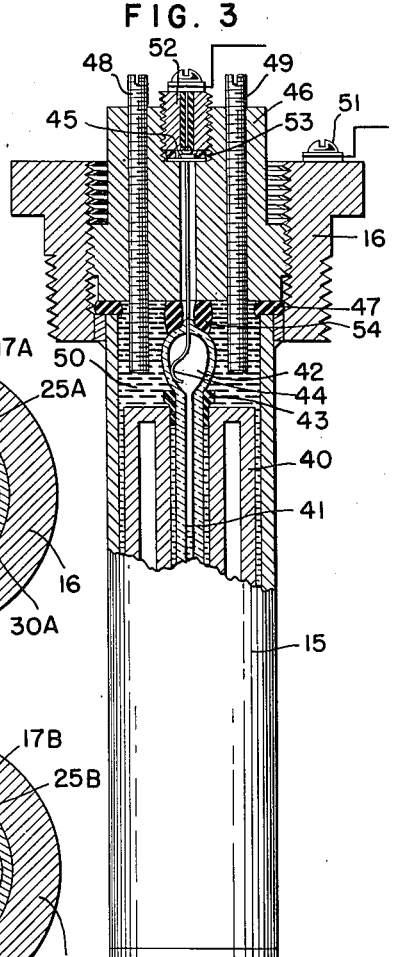
FIG. 3
*INVENTOR.*
PHILIP J. DONALD
BY *Arthur H. Swanson*
ATTORNEY.

2,769,070
Patented Oct. 30, 1956

United States Patent Office

2,769,070
PRESSURE TRANSDUCER APPARATUS

Philip J. Donald, Woodbury, N. J., assignor to Minneapolis-Honeywell Regulator Company, Minneapolis, Minn., a corporation of Delaware Application October 16, 1952, Serial No. 315,003

5 Claims. (Cl. 201—48)

The present invention is directed to an apparatus provided with a collapsible tube which causes a column of electrically conductive fluid to rise and fall in a capillary tube the walls of which are coated with an electrically conductive material.

A general object of the present invention is to provide a pressure measuring apparatus which will produce an electrical signal proportional to applied pressure changes. More specifically, the object of the present invention is to provide a pressure to electric transducer which incorporates a compressible tube the volume changes of which effect the rise and fall of an electrically conducting fluid in a capillary having an electrically conducting coating thereby to cause a resistance change by the shorting of said coating by the conducting fluid in accordance with the pressure changes under measurement.

Several problems arise in the construction and usage of such apparatus, particularly in connection with the collapsible tube associated with the capillary. One of these problems involves protecting the tube from excessive pressures. In providing such protection it is essential that maximum stressing of the compressible tube be effected without allowing the material of the tube to be stressed beyond its elastic limit. A further problem involves protecting the capillary from contaminants which may be present in the collapsible tube. In order to provide protection against difficulties arising from this source, it is essential that some trap be provided to collect contaminating elements at a point away from the capillary wherein these elements could interfere with the operation of the apparatus. A further problem arises in connection with rendering the apparatus insensitive to variations in ambient temperature. This involves satisfying several contradictory requirements. As the most available electrically conducting fluid is generally of a type which has an appreciable temperature coefficient of expansion, the expansion thereof with ambient temperature changes must not affect the height of the electrically conducting fluid in the capillary. A still further problem in such apparatus has to do with the requirement that volume changes of the collapsible tube be reflected only in the rise and fall of the electrically conducting fluid in the capillary. In accordance with the present invention, this latter requirement is met by maintaining a space within the capillary, which is not occupied by an electrically conducting fluid, under gas pressure. Consequently, critical spaces external of the capillary are completely filled with the electrically conducting fluid.

It is accordingly a more specific object of the present invention to provide a new and improved pressure protected and temperature compensated pressure to electric transducer.

Another object of the present invention is to provide a new and improved pressure measuring apparatus wherein a collapsible tube has the internal volume changes effective to cause a rise and fall of an electrically conducting fluid in a capillary which has an electrically conducting coating thereon and wherein said collapsible tube is suitably protected to prevent the tube from being stressed beyond its elastic limit.

Still another object of the present invention is to provide a pressure measuring apparatus wherein the apparatus includes an elongated hollow elliptical tube which is arranged to have pressure applied to the external surface thereof with the volume changes therein used for indication and with a protective element within said tube to prevent the stressing of the material of said tube beyond the elastic limit thereof.

A further object of the present invention is to provide a new and improved pressure to electric transducer utilizing the rise and fall of an electrically conducting fluid in a capillary which has the inner surface thereof coated with an electrically conductive coating and wherein said capillary is placed within and completely immersed in a collapsible tube with a capillary having a gas pressure therein to maintain the fluid in said tube in such condition that volume changes of said tube will be felt solely in the capillary tube.

A still further object of the present invention is to provide a pressure measuring apparatus which will produce an electrical signal in accordance with the rise and fall of a column of electrically conducting fluid in a capillary wherein contaminating objects in a collapsible tube which may affect a capillary will be diverted to an area where they will not adversely affect the capillary.

A still further object of the present invention is to provide a new and improved pressure to electric transducer employing an electrically conducting fluid having an appreciable temperature coefficient of expansion which is caused to rise and fall in a capillary tube having an electrically conducting coating thereon and wherein an adjustable compensation is provided for compensating the volume changes of the conducting fluid with changes in ambient temperature.

The various features of novelty which characterize the invention are pointed out with particularity in the claims annexed hereto and forming a part of the specification. For a better understanding of the invention, however, its advantages, and specific objects obtained with its use, reference should be had to the accompanying drawings and descriptive matter which illustrate and describe a preferred embodiment of the invention.

Of the drawings:

Figure 1 is a diagrammatic showing of one form that the pressure to electric transducer of the present invention may assume;

Figure 2A shows one form that the invention may assume in cross section as taken along the lines 2—2 of Figure 1;

Figure 2B shows another form that the cross section of the present invention may assume along the same cross section line 2—2 of Figure 1;

Figure 3 shows a modified form of the apparatus;

Figure 4 shows one form that the capillary tube of the apparatus used in Figure 3 may assume;

Figure 5 is a further showing of a modified form of the capillary tube; and

Figure 6 is another modification of the capillary tube.

Referring now to Figure 1 there is shown in cross sectional view the apparatus of the present invention and the manner in which it may be electrically connected to a suitable indicating and recording apparatus. The apparatus comprises an electrical pressure indicator indicated generally by the numeral 10 which is connected by a pair of electrical leads 11 and 12 to an electrical bridge network 13. The output of this bridge network may be a part of a measuring and indicating apparatus indicated generally at 14. The indicating and recording apparatus including the bridge 13 and the apparatus 14 may be of the type disclosed in the Walter P. Wills Patent 2,423,540, issued July 8, 1947. As is explained in detail in said Wills patent, the change in the electrical balance condition of the bridge 13 will be effective to cause operation of the measuring and recording apparatus 14.

Considering the pressure measuring apparatus 10 in greater detail, the apparatus comprises an elongated hollow elliptical tube 15 which is sealed at its lower end by crimping and welding or by the fastening of a sealing plate thereto. The cross sectional form of elliptical tube 15 may be as shown in either of Figures 2A or 2B, as 15A or 15B. The cross sectional form shown in Figure 2A is more of the true ellipse form while the cross sectional form of Figure 2B indicates that it may be a flattened tube having circular ends. The term elliptical is intended in its generic sense as applying to tubes of both types. These tubes are preferably of metallic construction and are capable of being collapsed so that the internal volume thereof changes with changes in pressure on the external side thereof.

The tube 15 is fastened at its upper end to a suitable coupling 16. This fastening may be accomplished by a stamped filler connector 17 having an external shape necessary to match the circular shape of the coupler 16 and an internal shape corresponding to that of the shape of the tube 15. This connecting plate is preferably welded in position so as to rigidly hold the tube 15 to the coupler 16.

Positioned within the tube 15 is a protective element 18 which is shown in cross sectional view in Figures 2A and 2B, as 18A and 18B. Element 18, as further explained hereinafter, is made of a material having little or no temperature coefficient of expansion, such as Invar. The internal cross section of the tube 15 will determine the type of cross section required of the protective element 18 as will be explained below. This protective element may be fastened to a washer 19 and suspended into the tube 15 with the washer supporting the element within the tube.

Also positioned within the tube is a capillary tubing 20. This capillary tube is preferably made of a non-porous ceramic or vitreous material, such as glass, and has a small hole running the length of the tube with the tube being sealed at the upper end thereof. The sides of the hole 21 are coated with an electrically conductive coating which has an appreciable resistance per unit area of the tubing. This capillary tube 20 is held in position by a resilient washer 22, which may be rubber or neoprene, which fits over the capillary and is fastened rigidly in position by a nut 23. The threads on the external side of nut 23 are arranged to engage the threads on the inner side of the coupling 16. The nut is screwed down into position and when so positioned the resilient washer 22 will be compressed and will expand along the main plane thereof so as to engage the capillary tube 20 and also the coupling 16 to provide a tight seal around the tube. At the upper end of the nut 23 in the central opening thereof is positioned a further resilient stopper 24 which is positioned over the tube 20 and acts to center the tube within the hole of the nut 23 as well as within the central hole extending through the protective element 18.

The space between the protective element 18 and the elliptical tube 15 is filled with a suitable electrically conducting fluid which may be mercury. An electrical connection is made to the conductive coating within the capillary tube 20 by an electrode 26, said electrode connecting to the conductor 11. This connection has to project down into the capillary to contact the coating. This distance is dependent upon the amount of the coating destroyed when the tube is sealed. A further electrical connection is made through the connecting terminal at 27 and this connection is by way of the coupling 16, and tube 15, to the electrically conducting fluid 25.

Considering now the general operation of the apparatus, it will be noted that the coupler 16 will be used to fasten the apparatus to any desired vessel whose internal pressure is to be measured. When the pressure applied to the outside of the tube 15 is greater than the ambient pressure at which the apparatus was assembled and adjusted, the tube 15 will be stressed and effectively compressed. The compressing or stressing of this tube 15 will cause a decrease in the volume thereof and this decrease in volume will act upon the electrically conducting fluid, which is incompressible, and will force the fluid from its normal position to some space in the apparatus. As the only space which is not occupied by the conducting fluid remains within the capillary tube 20, the fluid will rise in the capillary and electrically short circuit the conductive coating on the surface thereof. With the shorting of the coating on the sides of the hole 21 of the capillary tube 20 by the electrically conducting fluid 25, there will be a change in the electrical resistance between the terminals 27 and 26 of the apparatus. This change in resistance will be indicated by an unbalance in the bridge 13 and the measuring and recording apparatus 14 will operate to balance the bridge and in so operating will move the indicator of the recorder to a position which will be indicative of the resistance change. As this resistance change will be inversely proportional to the pressure change, the measuring apparatus will indicate pressure directly.

The protective element 18 in the tube 15 is arranged so that its cross sectional area is less than the internal cross sectional area of the elliptical tube. The cross sectional dimensions of the element 18 are governed by the type of collapsible tube into which the element is placed. In Figure 2A, the element is arranged with flat sides along the long side thereof. With this arrangement, when the tube 15A is exposed to an excessive pressure, the long sides of the tube 15A will collapse against the flat side of the element 18A and the short sides of the tube 15A will move away from the element 18A. With an increase in pressure the short sides of the tube 15A, as viewed in Figure 2A, will be caused to move away from the protective element 18A, and the effect of this movement will be to cause the short sides of the tube 15A to assume a more nearly circular cylindrical shape. When the short sides are of a circular cylindrical shape they will be able to stand maximum pressure without danger of collapse. This is obviously not the case as far as the long sides of the tube 15 are concerned, however, the long sides are prevented from collapsing by the element 18. It is essential that the tube 15A not tend to pivot on any point on the element 18A for if it should there would be a tendency to overstress part of the tube. In the apparatus of Figure 2A, the element 18A may be of such a size as to cause a preloading of the tube 15A by bearing against the ends thereof. This will mean that a desired pressure must be reached before the tube 15A will begin to collapse.

In Figure 2B where the tube 15B is said to have flat sides along the long edge thereof and cylindrical ends, the protection in this instance is primarily for the sides of the tube 15B. Here, the protective element 18B is shaped so that it is recessed along the central portion thereof so that the long sides of the tube will move into contact with the element. Here, the short sides of the tube 15B will still retain their circular cylindrical shape and will be protected as was the case of tube 15A. It can thus be seen when the tubes 15A and 15B have been exposed to an excessive pressure, they will collapse against their respective protective elements 18A and 18B and when so collapsed will be in a condition to withstand a maximum pressure.

As mercury is frequently used as the electrically conducting fluid, it is essential that the thermal coefficients of expansion of the mercury should not affect the movement of the mercury in the capillary tube 20. For this reason, the protective element 18 may serve a dual purpose. In one aspect, it serves to protect the tube 15, as discussed above, and in the other aspect it serves to maintain the volume of the fluid within the tube 15 relatively small so that the actual volume change resulting from the thermal coefficient of expansion of the mercury will be relatively small. By properly selecting the size of the element 18 and utilizing a material which has substantially zero coefficient of expansion with temperature change, and knowing the thermal coefficient of expansion of the tube 15, it is possible to design the apparatus so that the volume increases of the tube 15 will exactly compensate for the volume changes in the mercury due to temperature change. Additional temperature compensation may be effected in the apparatus of Figure 1 by adjusting the position of the capillary tube 20 as concerns its position within the tube 15. As the ceramic material of the capillary tube 20 will have a different coefficient of expansion than that of the mercury, it is possible to select the desired compensation by the distance that the capillary tube 20 is placed into the central hole of the protective element 18.

As the thermal mass of the apparatus directly associated with the mercury 25 may be appreciable, it is desirable that it be minimized where possible. One way of minimizing the thermal mass is to place closed holes extending along the length of the protective element 18, such as indicated at 30.

With the present apparatus arranged so that a collapsible elliptical tube is used to cause a rise and fall of a fluid and that fluid is used to short an electrically conductive coating in the capillary 20, it is essential that any undissolved contaminants due to scaling of the inner surface of the tube 15 shall not be allowed to affect the capillary tube on its inner electrically conducting coating. Protection in this instance is provided by using an electrically conducting fluid such as mercury, which has a relatively high specific gravity and which will cause the normal contaminants to rise to the top of the mercury. As the capillary tube is placed in the center hole of the protective element 18 which is effectively isolated from the internal surface area of the tube 15, contaminants will be trapped between the element 18 and the tube 15 at the upper end thereof away from the point where the capillary tube is positioned. There will also be a contaminant trap space between the tube 20 and element 18.

In order to protect the upper end of the capillary tube 20 which extends beyond the sealing nut 23 there may be provided a suitable mechanical cover, not shown.

In the apparatus shown in Figure 3, the basic elements of the coupling 16 and the tube 15 are the same and may be fastened together in the same manner as set forth in Figure 1. The cross section of the tube 15 again will be of elliptical shape and will correspond to that shown in either of Figures 2A or 2B. In this arrangement a protective tube 40 will be of the desired cross sectional shape such as shown in either of Figures 2A or 2B. In this instance the protective element 40 will be supported upon the bottom of the tube 15. Positioned within the center hole of the element 40 is a modified capillary tube 41 this capillary tube has an enlarged enclosure on the upper end thereof indicated by the numeral 42. This enclosure is filled with a suitable gas under pressure. The capillary tube 41 is retained in position within the center hole of the protective element 40 by a resilient centering member 43 which fits around the lower end of the enlargement on the upper end of the capillary tube. An electrode 44 extends into the capillary tube and then contacts the electrically conductive coating on the inner surface thereof and extends out the top of the enlargement by way of an insulated connection to a contact 45. The contact 45 is positioned within a nut 46 which has a central hole therein to permit the insulated conductor to run from electrode 44 to the contact 45. When the nut 46 is in position, it cooperates with a sealing washer 47 to seal the apparatus and with a retainer 54 which holds the enlargement on the upper end of the capillary 41 in position.

The nut 46 is threadedly engaging the inner threads of the connector 16.

Also threadedly positioned within the nut 46 are a pair of metallic adjustable plugs 48 and 49 which are selected to have different temperature coefficients of expansion. These elements are arranged to extend down into the area directly over the protective element 40. Filling the space between the element 40 and the tube 15 may be a suitable conducting fluid, such as mercury as used in Figure 1. Electrical contact is made with the conductive coating of the capillary 41 by way of a connector 51 and a further insulated connector 52 in the form of a nut adjustable in the top of the nut 46. The nut 52 cooperates with a sealing ring 53 to seal the internal portion of the tube 15 and prevent the escape of any fluid through the hole in the nut 46 through which passes the connection to the electrode 44.

In the arrangement shown in this figure it will be noted that the capillary tube 41 and its enlargement at the end 42 is positioned below the surface of the electrically conducting fluid. If the capillary tube 41 were evacuated, any vacuum in the system would tend to distribute itself between the capillary tube and the area directly above the element 40 outside of the capillary. In order to support the head of the conducting fluid, the chamber 42 is filled with a gas under pressure and this pressure will cause the fluid to be maintained under a pressure to cause the same to fill all spaces within the tube 15 outside of the capillary tube 41. The size of the chamber 42 and the hole in the capillary is selected so that the gas pressure remains substantially constant as the fluid rises and falls in the capillary; i. e., the gas pressure should not act nonlinearly on the fluid as the fluid height changes.

In the present arrangement, the protective tube 40 may again be of a material which has effectively zero temperature coefficient of expansion and this tube will cooperate to provide temperature compensation. However, since temperature compensation adjustments can not be made by movement of the capillary tube 41, it is essential in order to accommodate manufacturing tolerances, that some other means of compensation be provided. This is provided in the form of the adjustable elements 48 and 49 which are selected, as mentioned above, to be of different material so as to have different temperature coefficients of expansion. As one plug is advanced into the chamber it is necessary to remove the other and by proper adjustment a desired temperature compensation may be effected. As is obvious, the movement of the elements 48 and 44 may be done simultaneously by some suitable gearing, not shown. As with the apparatus in Figure 1, the present apparatus also protects against contaminants affecting the capillary electrically conducting coating. In the present arrangement the contaminants will rise into the area outside of the chamber 42 and also in the area outside the capillary 41.

The operation of the present apparatus is substantially the same as that of Figure 1 and pressure changes will cause a change in the level of the fluid in the capillary 41. All of the change will appear in the capillary since all other spaces within the enclosure set out by the confines of the tube 15 are completely filled with an incompressible liquid.

Figure 4 shows one manner in which the capillary 41 may be constructed. In order to minimize the tendency for the gas within the chamber 42 and the capillary of the tube 41 to escape, a restriction is placed in the capillary as indicated at 60. This restriction will prevent sudden shocks from causing the mercury to be forced from the capillary and allow the gas to escape to the outside of the capillary tube 41. This will also tend to minimize the tendency for the gas to leave the chamber when the apparatus is inverted. The end of the tube 41 has been cut at one angle at 61 to give a sloping edge. This serves to deflect any solid contaminants that may tend to rise about the tube 41.

Figure 5 shows a further form of the tube 51 arranged to provide a restriction 62 for the same purpose as the restriction 61 in Figure 4. This restriction 62 is formed by drawing out the end of the tube 41 and bending the open end so that it is upward. This provides further protection from contaminants that may tend to rise into the tube 41 from the surrounding mercury.

Figure 6 shows the lower end of the tube 41 sealed with a hole 63 opening in the side thereon near the lower end. This hole provides the place of entry for the mercury and with its location in the side of the tube serves to prevent contaminants from entering the tube 41.

Subject matter disclosed in this application and not claimed herein is being claimed in a divisional application, Serial No. 565,434, filed February 14, 1956.

In a copending application of E. Victor Larson, entitled "Measuring Apparatus" filed on even date herewith, there is disclosed and claimed the broad idea of placing capillary tubing completely within the collapsible tube.

While, in accordance with the provisions of the statutes, there has been provided and illustrated the best form of the invention known, it will be apparent to those skilled in the art that changes may be made in the form of the apparatus disclosed without departing from the spirit of the invention as set forth in the appended claims, and that certain features of the invention may be sometimes used to advantage without corresponding use of other features.

Having now described my invention, what I claim as new and desire to secure by Letters Patent is:

1. A pneumatic to electric transducer comprising, an elongated hollow collapsible elliptical tube having the external surface thereof arranged for exposure to a pressure to be measured, a protective element positioned within said tube having a cross sectional area less than the internal cross section area of said tube and arranged so as to prevent collapse of said tube in the event that said tube is exposed to an excessive pressure, said element having a hole extending along the length thereof, an incompressible electrically conducting fluid positioned within the space between said element and said tube and filling said hole in said element, a capillary tube of lesser outer diameter than said hole, said capillary being positioned within the hole of said element and extending below the uper end of said tube, said capillary having an electrical resistance coating extending along the inner surface thereof with said conducting fluid arranged to rise and fall within said capillary in accordance with internal volume changes of said tube, and electrical connections to said capillary for connecting thereto means for measuring changes in the resistance of said coating to obtain an electrical signal proportional to changes in pressure applied to said tube.

2. Apparatus as set forth in claim 1 wherein said electrically conducting fluid is mercury and said capillary extends below the upper surface of said mercury to cause contaminating materials which are lighter than said mercury to rise to the top of said tube away from the open end of said capillary to prevent the contamination thereof.

3. In a pressure transducer, the combination comprising, an elongated hollow elliptical tube adapted to have pressure applied to the external side thereof, and an elongated protective element within said tube and extending along the length thereof, said protective element having a cross sectional area less than the cross sectional area of said tube and bearing against the short sides of said tube and being displaced from the elongated sides of said tube so that as said tube is exposed to a high pressure the elongated sides will move against said element and the short side will move away from said element.

4. Apparatus as set forth in claim 3 wherein said short side when moving away from said element will assume a circular cylindrical shape which will withstand a maximum pressure.

5. Apparatus as set forth in claim 3 wherein said protective element has an elongated cross sectional distance greater than the internal elongated cross sectional distance of said tube when unstressed and bears against the short sides of said tube when placed therein with sufficient force to pre-load said tube so that a predetermined pressure must be exceeded before the elongated sides of said tube will move toward the sides of said element.

References Cited in the file of this patent

UNITED STATES PATENTS

| | | |
|---|---|---|
| 2,037,949 | Tate | Apr. 21, 1936 |
| 2,244,334 | Hopkins | June 3, 1941 |
| 2,566,369 | Putman | Sept. 14, 1951 |
| 2,570,943 | Hass | Oct. 9, 1951 |

FOREIGN PATENTS

| | | |
|---|---|---|
| 112,663 | France | Apr. 29, 1816 |
| 590,063 | France | Mar. 8, 1925 |
| 135,332 | Switzerland | Mar. 14, 1930 |